No. 751,960. PATENTED FEB. 9, 1904.
R. E. TERRY.
SINGLE TRACK ELEVATED RAILROAD FOR LOGS, &c.
APPLICATION FILED JAN. 29, 1903. RENEWED JAN. 16, 1904.
NO MODEL. 3 SHEETS—SHEET 1.

Witnesses
E. F. Stewart
Jno. E. Parker

R. E. Terry, Inventor.
by C. A. Snow & Co.
Attorneys

No. 751,960. PATENTED FEB. 9, 1904.
R. E. TERRY.
SINGLE TRACK ELEVATED RAILROAD FOR LOGS, &c.
APPLICATION FILED JAN. 29, 1903. RENEWED JAN. 16, 1904.
NO MODEL. 3 SHEETS—SHEET 2.

No. 751,960. PATENTED FEB. 9, 1904.
R. E. TERRY.
SINGLE TRACK ELEVATED RAILROAD FOR LOGS, &c.
APPLICATION FILED JAN. 29, 1903. RENEWED JAN. 16, 1904.
NO MODEL. 3 SHEETS—SHEET 3.
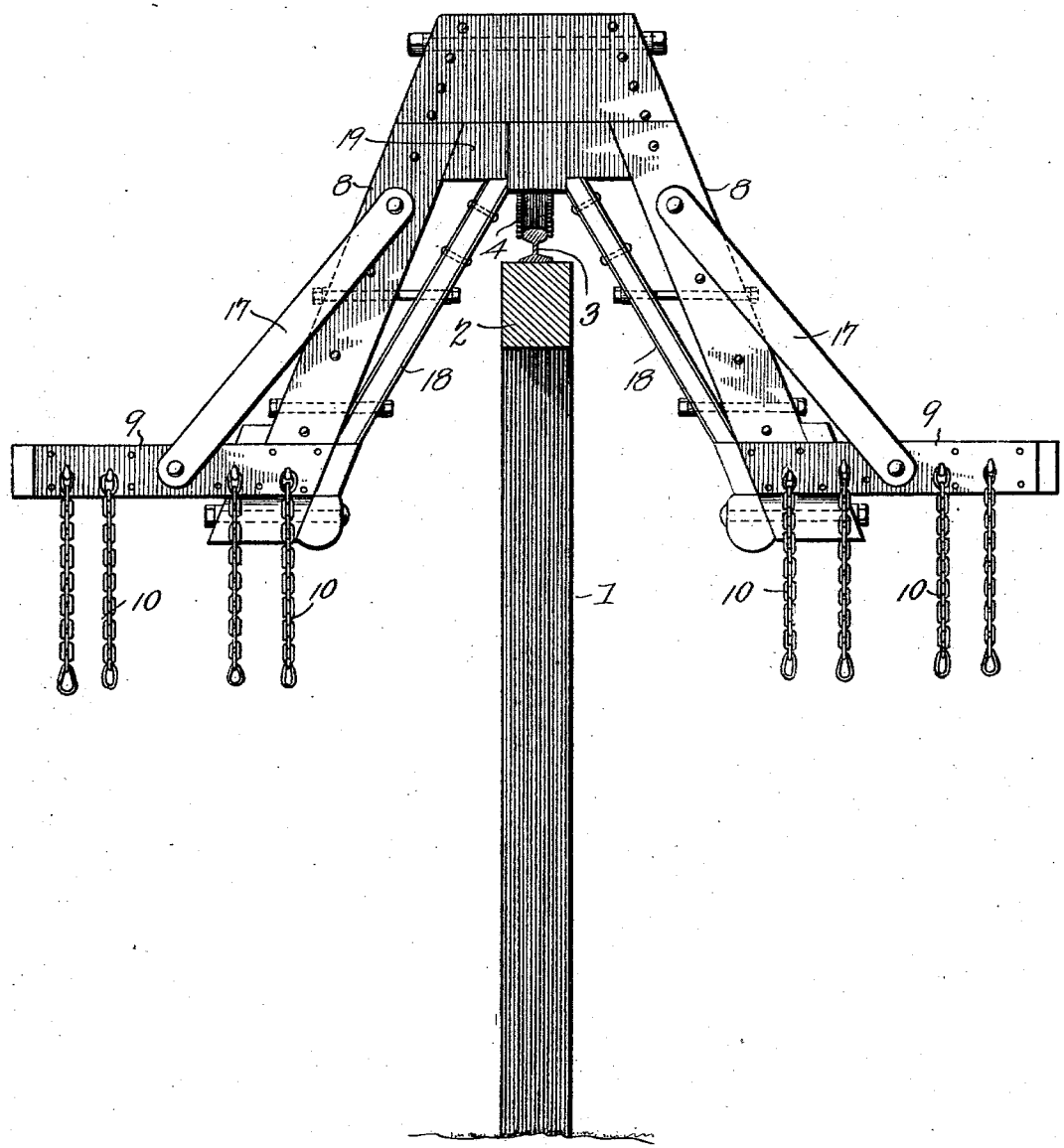

No. 751,960.
Patented February 9, 1904.

UNITED STATES PATENT OFFICE.

ROBERT EMETT TERRY, OF MOBILE, ALABAMA.

SINGLE-TRACK ELEVATED RAILROAD FOR LOGS, &c.

SPECIFICATION forming part of Letters Patent No. 751,960, dated February 9, 1904.

Application filed January 29, 1903. Renewed January 16, 1904. Serial No. 189,376. (No model.)

*To all whom it may concern:*

Be it known that I, ROBERT EMETT TERRY, a citizen of the United States, residing at Mobile, in the county of Mobile and State of Alabama, have invented a new and useful Single-Track Elevated Railroad for Logs, &c., of which the following is a specification.

This invention has relation generally to single-track elevated-railways and trucks for carrying passengers, lumber, logs, or any other kind of freight, and it has special reference to railways of the kind mentioned which are adapted to have a truck or car run thereon constructed to carry a load on each side of the rail.

It is the object of my invention to provide such improvements in single-track elevated railways and their trucks as will simplify their construction and enhance their durability, a further object being to improve the means connected with the truck proper and the freight carried thereby as will equalize the weight or strain brought to bear on each side of the truck-wheels and so maintain the wheels in vertical position on the track and the truck in practically evenly-balanced position, though the weight of the loads on the opposite sides of the track may vary.

The invention consists of the novel construction and arrangement of parts, as will more fully appear from the detailed description hereinafter given, reference being had to the annexed drawings, forming a part of this specification, in which—

Figure 1:
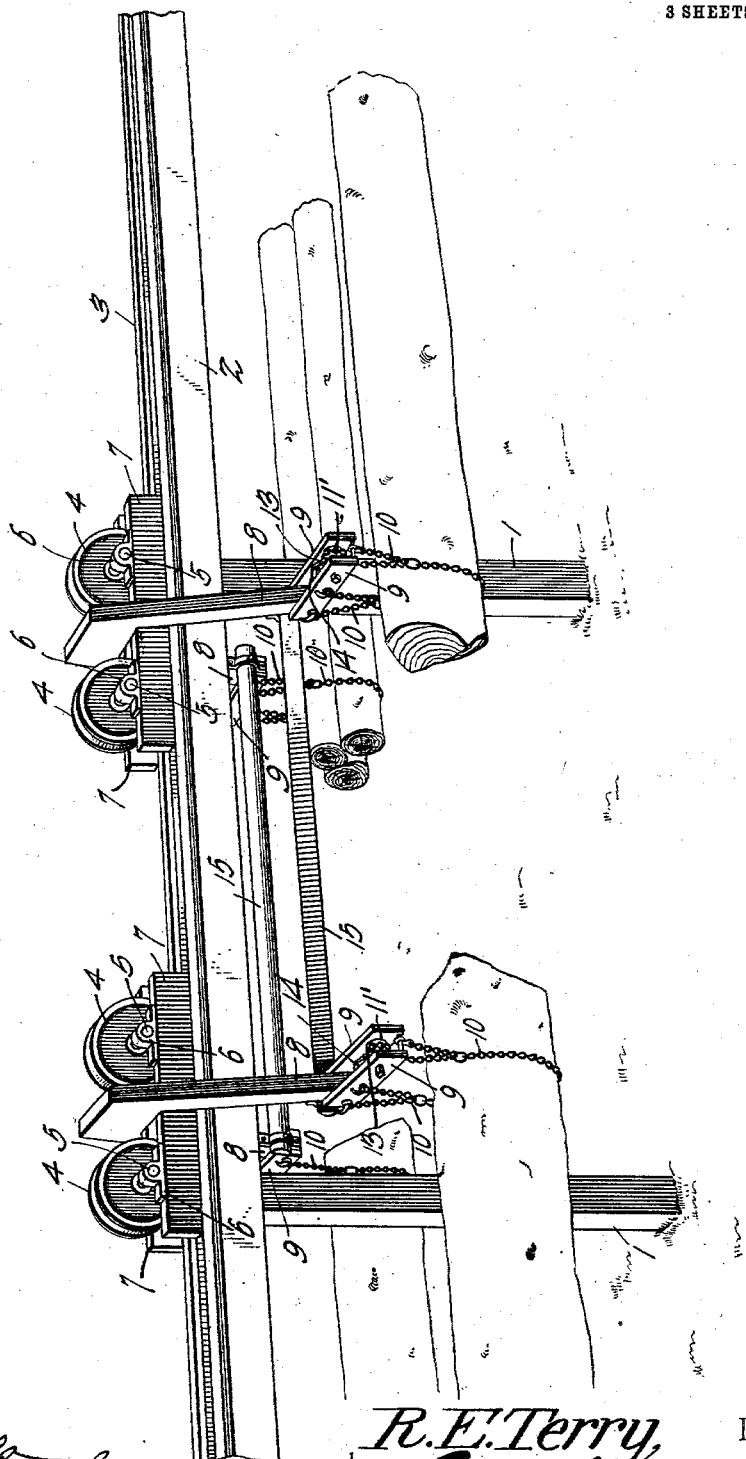
Figure 2:
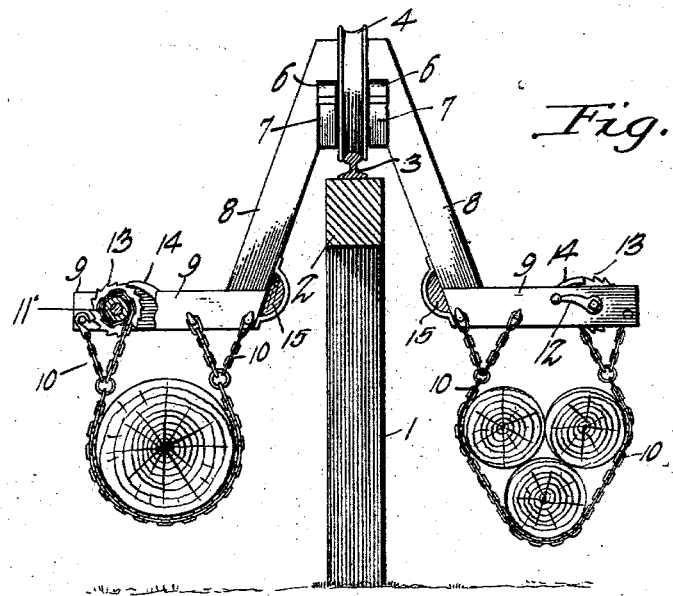
Figure 3:
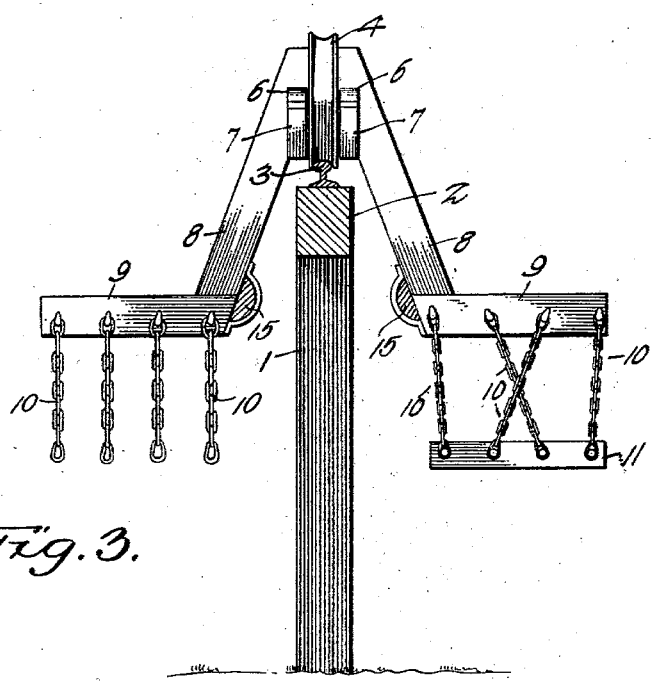

Figure 1 is a perspective view of a section of my improved single-track elevated railway and truck, showing the invention as carrying logs on each side of the track and illustrating also a manner of coupling one truck with another and of coupling a series of loaded trucks with another series. Fig. 2 is a sectional end elevation showing the truck on one side as loaded with a number of logs and on the opposite side as carrying a single log. Fig. 3 is also a sectional end elevation showing the truck as provided on one side with a platform for carrying freight other than logs or lumber necessitating but a single truck, the other side of the truck being illustrated as provided with chains or cables to connect the horizontal arms with the freight carrier or platform. Fig. 4 is a sectional elevation illustrating a preferred form of truck structure designed for the carrying of heavy loads.

Similar numerals of reference designate similar parts or features, as the case may be, wherever they occur.

In the drawings, 1 designates a line of posts set firmly in the ground in vertical position and of suitable height, upon the upper ends of which are secured stringers 2 of a strength and size that may be required or desired.

3 designates the rail spiked upon or in any other suitable way secured upon the stringers. The rail 3 may be the ordinary T rail-way-rail or a rail of any form that will be suited to have the double-flanged wheel 4 run thereon.

As I have elected to show the invention, the truck is provided with two wheels of the character described, one arranged in advance of the other. Each wheel is provided with journals 5, supported in bearings in the boxes 6, connected with the side bars 7 of the truck. These journal boxes and bearings may be constructed and arranged as is common in well-made car-trucks and form no part of my present improvements.

8 designates arms connected at their upper ends in any suitable way with the truck between the wheels and extending down and outward at an angle, for instance, of thirty-five degrees. To the lower end of each of the arms 8 there is connected a preferably integral arm 9, which extends outward at a true right angle to the sides or faces of the wheels and parallel with the axes of the latter.

10 designates a plurality of chains connected with each of the arms 9 at different points along its length, which chains are adapted to be secured to the freight to be carried or to a platform 11, as is shown in Fig. 3, upon which passengers or freight may be carried. It is through the medium of these chains that I am enabled to effect the equalizing of the weight of the load carried by the arms of each pair with respect to the trucks and their wheels. It will therefore be seen that cables, ropes, or other devices flexible in character and suitable to the purpose may be used in place of the chains and with the same effect.

Supposing that the invention is put in use for the purpose of carrying logs, the latter after being rolled into place to be loaded by passing outer chain under the log and securing the outer free end to the drum 11', suitably supported upon a shaft carried on the outer end of each of the horizontal arms 9, said shaft being adapted to have a crank 12 applied thereto to turn the drum and wind up the outer end of said chain to the desired extent, lifting and loading the log. It is to be understood that at the start the inner end of the chain was properly secured to the horizontal arm at or near its inner end. A ratchet-wheel 13 is connected with the drum or its shaft and has a pivoted pawl or dog 14 engaging it to keep the drum from turning back, all as is well known to those skilled in the art. After the work mentioned is done the inner chain may be passed around under the log or logs and its ends secured at different points on the horizontal arm inside of the points of fastening the outer chain. The logs may, however, be loaded in any other desired way, provided the chains or their equivalents are connected with the horizontal arms 9 at the points mentioned or at any other point or points that will effect the equalizing functions specified. Supposing, further, each of the pair of arms carried by a truck to be loaded with a log or logs (see Fig. 2) and that the weight of one load in itself is greater than the other and that there is a tendency of the heavier load to carry its supporting-arm 9 downward to a greater degree than the other similar arm of the other load on the other side of the truck, the draft or power exerted on the chains will be transferred in proportion to the overweight from the outer portions of the chains to the inner portions, and consequently the power exerted on the horizontal arm to which the chains under consideration are attached will be transferred to a point in from its outer end corresponding in extent to the overweight. Having consideration now to the lighter load carried by the arms on the other side of the truck, where a tendency for the arms to rise exists, the reverse operation will take place—that is, the power exerted by the load on the horizontal arm will be transferred outward thereon to an extent corresponding to its underweight relatively to the opposite load. In this way, considering the operation of the invention as just described, in view of the laws governing the use of a lever of the first class an evening of the weight upon the arms is automatically secured by the automatic shifting of the point at which the loads exert power on their respective arms, and the wheels on the truck are maintained in vertical position, and the two loads of freight are carried in the same horizontal plane. The same result is secured when the chains or their equivalents are connected with the horizontal arm 9 and the platform at different distances along the length of the same, as shown in Fig. 3, and it is obvious that as many chains or cables may be used as is desired or necessary.

In Fig. 1, 15 designates a coupling-pole arranged upon and connected with the lower ends of the arms 8 of a pair or series of trucks carrying the same or different loads, and 16 designates coupling-poles connecting the trucks to form trains of trucks on the track. The coupling-poles 15 in addition to connecting the trucks may assist in balancing said trucks during the loading and unloading operation.

In Fig. 4 I have shown the preferred form of truck structure designed for the carrying of heavy loads. In this case the several truck members are plated with iron in order to strengthen the structure and prevent damage to the timbers, while the arms 8 and 9 are further braced and strengthened by the employment of tension-bars 17. The platform members 9 are extended inwardly to form lower bearings for struts 18, the upper ends of which bear against auxiliary timbers 19, arranged to resist upward thrust due to the presence of a load on the platform members 9.

The trucks or trains of trucks may be drawn by horses or other draft-animals or by an engine or other power traveling upon the ground, or I may employ a suitable form of engine traveling on the trackway.

Having thus described the invention, what is claimed is—

1. In single-track elevated railways, a truck provided with wheels adapted to run on the track, an arm on each side of the truck connected at its upper end with the latter, and extended down and outward at an inclined angle with respect to the vertical sides of the wheels, an arm connected at its inner end to each of the inclined arms and extended out at a right angle to the vertical sides of the wheels and parallel with the axes of the wheels, and flexible means connected at different points with the horizontal arms along the length thereof and adapted to support the freight to be carried.

2. A truck for single-track elevated railways, consisting of the truck-frame proper and its wheels, arms connected at their upper ends with the truck-frame and extended down therefrom, one on each side of the truck, an arm connected at its inner end to the lower end of each of the first-mentioned arms and extended out horizontally and parallel with the axes of the wheels, and flexible load-supporting means connected with the horizontal arms at different points along the length thereof.

3. The combination with the truck-frame proper and its wheels, of horizontal arms on each side of the truck extended parallel to the axes of the wheels, flexible freight-supporting means connected at different points along the length of said arms, and means for connecting the said horizontal arms with the frame.

4. In single-track elevated railways, a truck provided with two wheels, one in advance of the other, to run upon the track, an arm on each side of the truck connected at its upper end with the truck on a line extending between the wheels, and extended down and outward at an inclined angle with respect to the vertical sides of the wheels, an arm connected with each inclined arm and extended out at a right angle to the vertical sides of the wheels and parallel with the axes of the wheels, and flexible means connected at different points with the horizontal arms along the length thereof and adapted to support the freight thereof.

5. In single-track elevated railways, the combination with the trucks and carrying-arms on each side of the same, of coupling-poles to connect different trucks carrying the same load, and coupling-poles for connecting trucks carrying the same loads with others carrying other loads and forming trains.

6. In single-track elevated railways, the combination, with the trucks and freight-carrying arms on each side of the trucks, of weight-equalizing means for connecting the freight to be carried with the arms.

7. A truck for single-track railways, comprising the supporting-wheels, angularly-disposed arms carried by the wheels, horizontal arms connected to the angular arms, and tension and compression members connecting the horizontal arms to upper portions of the truck structure.

8. A truck for single-track railways, comprising the upper truck members, a supporting-wheel having bearings therein, angularly-disposed arms depending from the upper members, horizontal arms connected to the angular arms and extending inwardly beyond said angular arms, compression members disposed between the inner portions of the horizontal arms and the upper truck members, and tension members connecting the angular and horizontal arms.

In testimony that I claim the foregoing as my own I have hereto affixed my signature in the presence of two witnesses.

ROBERT EMETT TERRY.

Witnesses:
G. B. DANTZLER,
J. IRWIN BURGETT.